(12) United States Patent
Doll et al.

(10) Patent No.: US 6,352,030 B1
(45) Date of Patent: Mar. 5, 2002

(54) GAS GENERATING EJECT MOTOR

(75) Inventors: Daniel W. Doll, North Ogden, UT (US); Gary K. Lund, Malad, ID (US); Craig D. Hughes, Salt Lake City, UT (US); Marc A. Hall, North Ogden, UT (US); David J. Macon, Ogden, UT (US)

(73) Assignee: Cordant Technologies Inc., Salt Lake City, UT (US)

( * ) Notice: Subject to any disclaimer, the term of this patent is extended or adjusted under 35 U.S.C. 154(b) by 0 days.

(21) Appl. No.: 09/436,357

(22) Filed: Nov. 9, 1999

Related U.S. Application Data
(60) Provisional application No. 60/108,457, filed on Nov. 12, 1998.

(51) Int. Cl.[7] ............................... C06D 5/00; F41F 3/04
(52) U.S. Cl. ...................... 102/291; 102/287; 102/289; 102/374; 60/256; 89/1.807; 89/1.818
(58) Field of Search ........................... 89/1.807, 1.813, 89/1.814, 1.818; 102/374, 380, 347, 287, 289, 291; 60/253, 255, 256

(56) References Cited

U.S. PATENT DOCUMENTS

| | | |
|---|---|---|
| 2,524,591 A | 10/1950 | Chandler |
| 3,115,008 A | 12/1963 | Cohen et al. |
| 3,172,058 A | 3/1965 | Freeborn |
| 3,173,249 A | 3/1965 | Wiggins ..................... 60/35.6 |
| 3,203,174 A | 8/1965 | Sutherland .................. 60/35.6 |
| 3,648,461 A | 3/1972 | Bailey et al. ................. 60/271 |
| 3,713,386 A | 1/1973 | Zaid ............................ 102/38 |
| 3,724,377 A | 4/1973 | Birkigt ........................ 102/38 |
| 3,903,802 A | 9/1975 | Sguiers |
| 4,332,631 A | 6/1982 | Herty, III et al. .......... 149/19.2 |
| 4,458,483 A * | 7/1984 | Vetter ........................... 60/253 |
| 5,024,160 A | 6/1991 | Canterberry et al. ........ 102/323 |
| 5,081,930 A | 1/1992 | Williams .................... 102/292 |
| 5,725,699 A | 3/1998 | Hinshaw et al. ........... 149/19.1 |

FOREIGN PATENT DOCUMENTS

| | | |
|---|---|---|
| DE | 26 33 649 | 2/1978 |
| EP | 0 477 482 A1 | 4/1992 |
| GB | 1586109 | 3/1981 |

* cited by examiner

*Primary Examiner*—Peter A. Nelson
(74) *Attorney, Agent, or Firm*—Sullivan Law Group

(57) ABSTRACT

A gas generating eject motor includes a case containing an ignitable low temperature gas generant material that does not produce toxic gases upon the combustion thereof. The gas generant material is generally contained with a screen enclosure housed within the case. An igniter is disposed within the gas generant material for selectively igniting the gas generant to thereby generate combustion gases. A nozzle is disposed within an open aft end of the case for focusing and directing the combustion gases generated by the ignited gas generant material. The case is constructed and arranged to be separably attached to the aft end of a rocket to be launched from a launch platform, so that, upon ignition of the gas generant, the combustion gases focused by the nozzle will apply a thrust to the rocket and thereby propel, or eject, the rocket from the launch platform, at which time the combustible propellant of the rocket motor will ignite and the eject motor will be separated from the rocket.

14 Claims, 2 Drawing Sheets

GAS GENERATING EJECT MOTOR

Claims benefit of Provisional Application Ser. No. 60/108,457, filed Nov. 12, 1998.

BACKGROUND OF THE INVENTION

Launched missiles typically employ combustible rocket motor propellants which generate high temperature gases in their exhaust plumes, thus subjecting the launch platform to a hazardous and destructive environment upon deployment of the missile. The problem can be particularly acute for personnel-held launch platforms, such as shoulder-launched missiles, where the temperatures and gases associated with the exhaust plume can create unsafe conditions. Further, the noise level generated by rocket motor propellants during missile launch is also very high. The potentially unsafe conditions are exacerbated when a shoulder-launched missile is operated from a confined or enclosed area, thereby also subjecting the operator to the toxic gases of the missile exhaust. High temperature exhaust gases can also damage the launch platform. Moreover, the high temperature exhaust plumes exhibit a high infrared signature, thereby potentially betraying the position of the launch platform in a hostile environment.

Consequently, it is necessary that the launch platform be protected or rebuilt after a launch, and/or that the operator use protective equipment, both to protect the hearing and also to prevent the operator from being burned by the exhaust plume of the missile as it leaves the launch platform.

Eject motors have been used to avoid some of the problems described above. An eject motor is a secondary propulsion device that attaches to a missile having a primary propulsion motor which employs combustible rocket motor propellants. The eject motor propels the missile from its launch platform using a propellant that creates less noise, toxic gases, heat, and/or smoke than the primary rocket motor propellant. When the missile is a safe distance from the launch platform and the operator, the primary propulsion motor is ignited. Conventionally, eject motors using reduced smoke propellants have been used as a means for initiating the missile launch sequence by propelling the missile from the launch platform prior to ignition of the primary propulsion motor. Typical reduced smoke propellants develop large amounts of carbon monoxide and hydrochloric acid gases, which can be hazardous to an operator and further have readily detectable infrared emissions.

SUMMARY OF THE INVENTION

The above-described disadvantages associated with prior rocket eject motors are avoided in accordance with the present invention, which relates to an eject motor to be coupled to a missile that is launched from a launch platform structure and is propelled by ignited combustible rocket motor propellant. The eject motor initiates a launch sequence of the missile by propelling the missile from the launch platform structure prior to ignition of the combustible rocket motor propellant. In accordance with the present invention, the eject motor comprises a case including a structure for coupling the case to the missile, an ignitable gas generant material stored in the case, a generant screen disposed within the case for retaining the ignitable gas generant material within the case, an igniter mechanism constructed and arranged to ignite the ignitable gas generant material, the ignitable gas generant material generating combustion gases when ignited, and a nozzle secured to the case and constructed and arranged to focus and direct combustion gases generated by the ignitable gas generant material to create a thrust acting on the missile to which the eject motor is coupled to propel the missile from the launch platform structure.

Gas generants used in the eject motor, which may be the same as those used in automotive airbag inflators, produce non-toxic combustion gases which are cooler than the exhaust gases from conventional rocket propellants. Like an automotive air bag inflator, the eject motor of the present invention employs a screen pack to retain condensable combustion products and to reduce noise levels generated during operation of the eject motor.

Conventional rocket motor propellants typically do not completely oxidize during engine burn and thus often experience a secondary burn outside the rocket engine housing. Gas generant propellants, on the other hand, do completely oxidize during combustion and thus do not experience after burning, or secondary burning, outside the rocket engine housing. Moreover, gas generant propellants typically combust with lower flame temperatures than conventional rocket motor propellants. Thus, due to the lack of after burning and the lower flame temperatures, the exhaust products of gas generants generally produce less of an infrared signature when compared to exhaust products of conventional rocket motor propellants. Moreover, as opposed to the toxic gases produced by primary rocket propellants and reduced smoke propellants, gas generants produce primarily $H_2O$, $N_2$, and some $CO_2$ gas.

Other objects, features, and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

DESCRIPTION OF THE PREFERRED EMBODIMENT

Figure 1:
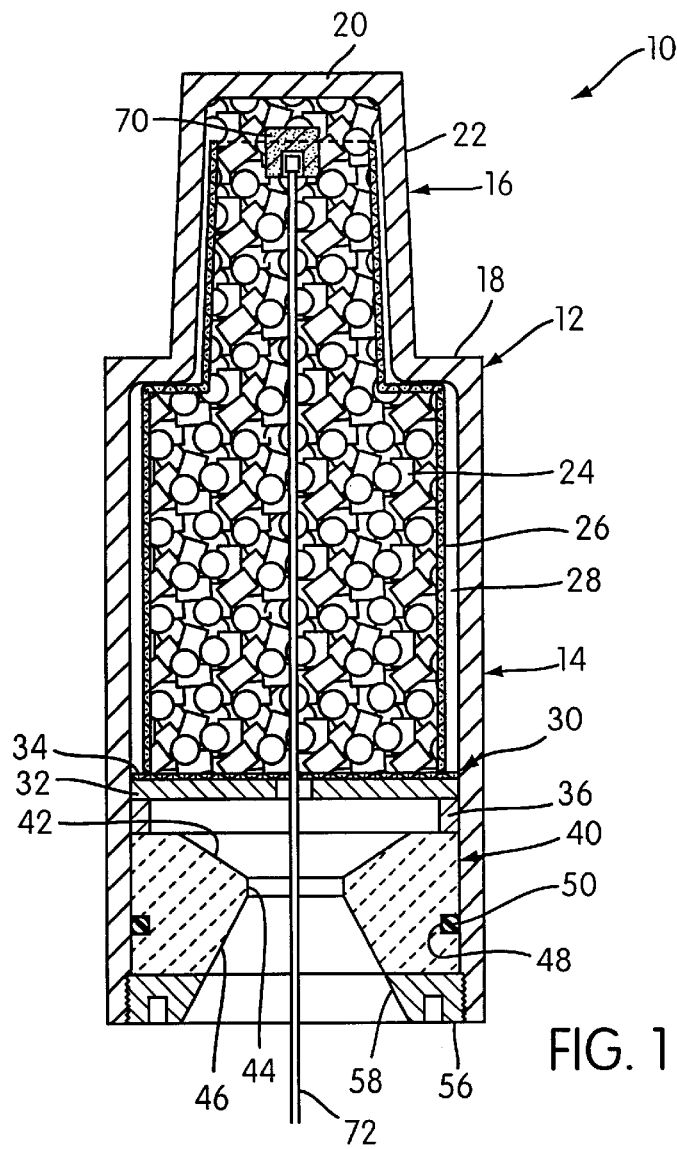
FIG. 1 is a side elevation in cross section of the gas generant eject motor of the present invention.

An eject motor shown in cross section is designated generally by reference number 10 in FIG. 1. The eject motor 10 includes an external case 12 preferably formed of a metal such as steel or aluminum, an ignitable gas generant 24 formed as grains of predetermined size and shape (e.g., pellets shown in FIG. 1) and housed within a screen pack 26 inside the case 12 and retained by an aft screen assembly 30, and a nozzle 40 disposed at an open end of the case 12 for focusing and directing combustion gases generated by the gas generant 24.

In the preferred embodiment, the case 12 generally includes a lower cylindrical portion 14 and an upper conical portion 16 having a tapered side 22 that slopes inwardly toward the top closed end 20 of the case 12. The largest diameter of the upper conical portion 16 is smaller than the diameter of the lower cylindrical portion 14, thereby defining an axially facing annular shoulder 18 therebetween. Upper conical portion 16 and shoulder 18 define a coupling structure for coupling the eject motor 10 to a missile (not shown in the figure).

Gas generant material compositions that are suitable for use in this application are described in, for example, U.S. Pat. No. 5,725,699 and U.S. Pat. No. 5,592,812, the respective disclosures of which are hereby incorporated by reference. For proof of concept testing, the present inventors have used a gas generant composition of 4 wt % polyacrylamide (PAM), 23 wt % basic copper nitrate (BCN), and 73 wt % hexammine cobalt (III) nitrate (HACN).

A preferred grain geometry for the gas generant is a right circular cylinder of 0.125 inch diameter and 0.125 inch length. About 100–200 gm of gas generant is used. The grains are manufactured by extruding a water wet dough of the composition, cutting to size, and drying the grains.

The ignitable gas generant 24 is of a type typically used with automotive airbag inflators and produces non-toxic combustion gases which are generally cooler than the exhaust gases emitted from typical rocket propellants used in primary propulsion motors. High performance gas generants can be manufactured easily and inexpensively into high surface area grain geometries, which provide short action times. The exhaust gases are cooled during the combustion of the gas generant by the formation of metal in formulation which is precipitated out as a metal oxide, thereby absorbing heat created during combustion.

The screen pack 26 generally comprises a metal mesh material formed into a shape generally conforming to the interior of the upper conical portion 16 and the lower cylindrical portion 14. Spacer structures (not shown), such as metal rods, are disposed between the interior walls of the case 12 and the screen pack 26 to create an annular space 28 between the screen pack 26 and the interior walls of the case 12.

Figure 2:
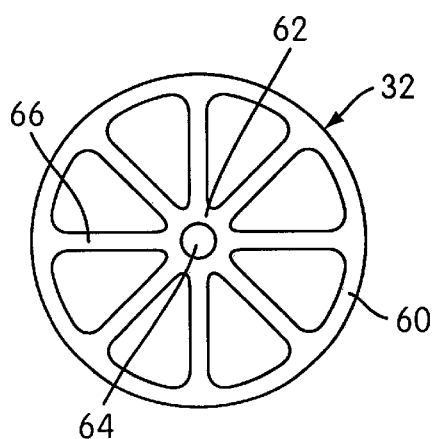
FIG. 2 is a plan view of a retainer wheel of an aft screen assembly of the eject motor.
Figure 3:
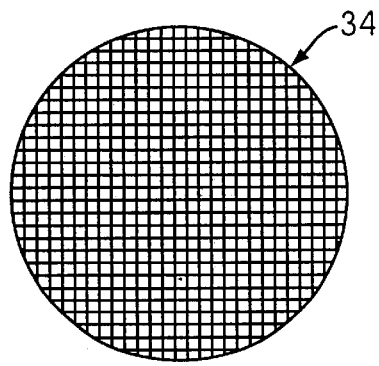
FIG. 3 is a plan view of a screen mesh of the aft screen assembly.

The granular ignitable gas generant 24 is retained within the screen pack 26 by an aft screen assembly 30 disposed at a bottom end of the screen pack 26. That is, the screen pack 26 and the aft screen assembly form a screen enclosure that generally contains the gas generant 24. The aft screen assembly 30 comprises a screen mesh 34 (see FIG. 3) which contacts the gas generant material 24 and a retainer wheel 32 which supports the screen mesh 34. As shown in FIG. 2, the retainer wheel 32 generally comprises an outer ring 60, an inner hub 62 having a central opening 64 formed therein, and a plurality of radially extending spokes 66 extending between the outer ring 60 and the inner hub 62. In the illustrated embodiment, eight spokes spaced by 45° are provided.

The screen pack 26 and the aft screen assembly 30 both filter and condense solid combustion products created during combustion of the gas generant material and thereby cool the combustion gases.

For proof of concept testing in which the screens 26, 34 and the wheel 32 may be reused for multiple tests, stainless steel is a preferred material because of its durability. On the other hand, for field units in which components likely will not be reused, low carbon steel would be a satisfactory material for the screens and wheel.

A nozzle 40 is disposed inside the case 12 near the open aft end of the case 12. Nozzle 40, preferably formed of graphite, has a cylindrical outer surface generally conforming to the inner surface of the lower cylindrical portion 14 of the case 12. The nozzle 40 has a segmented central opening generally defining an inwardly tapered contraction portion 42, a throat 44, and an outwardly tapered expansion portion 46. An O-ring 50 is disposed within a peripheral O-ring groove 48 for providing a seal between the nozzle 40 and the case 12.

A stand-off ring 36 is preferably disposed between the aft screen assembly 30 and the nozzle 40 for providing a spacing therebetween.

A nozzle retention ring 56 is disposed inside the case 12 at its aft end for retaining the nozzle 40, the stand-off ring 36, the aft screen assembly 30, the screen pack 26, and the gas generant 24 within the case 12. Nozzle-retention ring 56 is preferably formed of the same material as the case 12 and may have external peripheral threads which mate with internal threads formed on the case 12 for securing the retention ring 56 in the case 12, or the nozzle-retention ring 56 may be secured within the case 12 by a snap-ring (not shown). Nozzle retention ring 56 includes a central opening 58 which defines tapered walls extending from and conforming to the expansion portion 46 of the nozzle 40.

An igniter pack 70 is embedded in the gas generant 24 for providing a high temperature flame which rapidly spreads throughout the generant 24, thereby igniting the bulk of the generant 24 in a relatively short period of time. The igniter 70 is composed of a conventional pyrotechnic squib embedded in a bag of igniter granules or pellets (B/KNO$_3$) or in contact with a stick of B/KNO$_3$ igniter. A pair of lead wires 72 extend to the igniter 70 for passing a current through the igniter 70 to activate the igniter.

Upon ignition of the gas generant 24, the combustion gases created thereby flow simultaneously through the aft end screen assembly 30 and also radially through the screen pack 26 and axially along the interior wall of the case 12 within the annular gap 28 between the case 12 and the screen pack 26. Condensable metal slag deposits internally on the screen, thus allowing non-toxic gases to exit the rocket motor at a temperature that is much cooler than that of conventional rocket motor exhaust gases. The combustion gases flow through the nozzle 40 to create a thrust-generating exhaust plume.

The combustion temperatures generated by solid rocket motor propellant can easily exceed 2000° K at the exit plane of the nozzle. The eject motor gas generant material combustion temperatures after cooling by the screen pack are typically less than 1000° K.

The coupling structure defined by the upper conical portion 16 and annular shoulder 18 of the case 12 is preferably sized and shaped so that it may be attached to the inside of the nozzle exit cone of the primary rocket motor. The eject motor 10 may be secured to a rocket motor by a rubber cement, such as a commercially available RTV adhesive, which creates an adhesive bond that fails due to the pressure created by the expulsion of gases through the nozzle of the primary rocket motor so that the eject motor 10 is separated from the missile by ignition of the primary rocket motor. Alternatively, the eject motor can be equipped with an aero-braking device which separates the eject motor from the main rocket body after eject motor burnout.

In a test conducted by the inventors, a commercially available RTV adhesive was used to adhere the eject motor to the aft end of a rocket motor nozzle. The adhesive material was selected because of the required failure pressure (i.e., 200–400 psi). In addition, the mechanical properties of the adhesive remain constant over the entire temperature operating range (typically –65° F. to 165° F.) of the primary rocket motor. Two bonding surfaces were initially solvent wiped using methyl ethyl ketone (MEK), which was allowed to flash off. Subsequently, a silane primer was applied to both bonding surfaces and allowed to dry for 60 minutes under ambient conditions. A wetting coat of the RTV adhesive was then applied to the bonding surfaces and the two pieces of hardware were brought into contact. After allowing the adhesive to cure at room temperature for a minimum of 24 hours, the bonded hardware was pressure tested at a rate of 2700 psi/second. This caused the adhesive to fail at 326 psig with a failure mechanism that was purely cohesive. This type of failure indicates that the adhesive joint will continue to fail at similar pressures. The inventors further tested an eject motor according to the present invention on a 2.75 inch rocket. In the test, an eject motor containing 160 grams of non-azide gas generant with a grain size of 0.125 inch×0.125 inch and a right circular cylindrical geometry and an 8 mesh screen pack and a 14 mesh aft screen successfully launched a 2.75 inch rocket motor from a man-portable launcher, at a velocity of approximately 100 feet per second.

It should be understood, however, that the present invention is applicable to rockets and missiles other than shoulder-launched missiles.

Figure 4A:
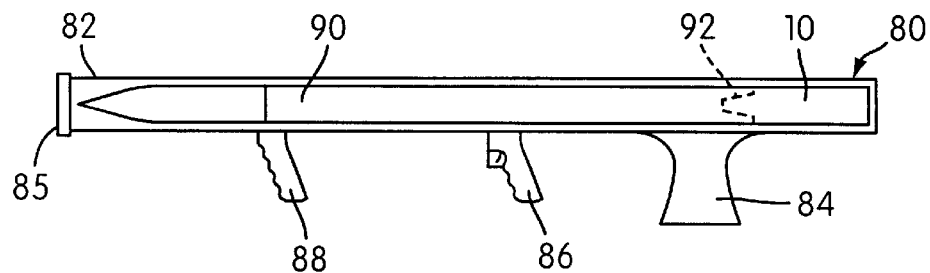
FIGS. 4A–4D are schematic views illustrating a launch sequence initiated by the eject motor of the present invention.
Figure 4B:
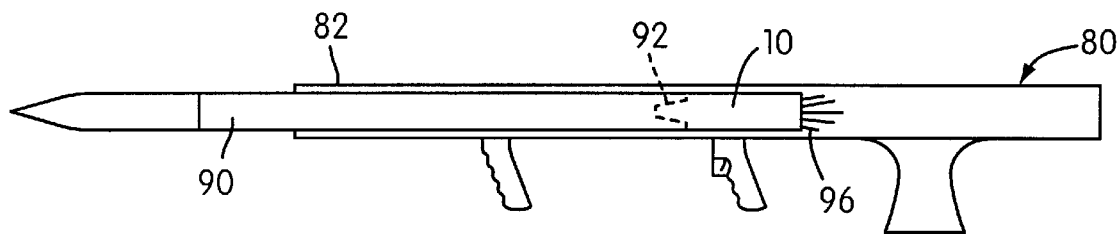

A missile launch sequence initiated by a gas generant motor according to the present invention is schematically shown in FIGS. 4A–4D. Shown in FIG. 4A is a launch platform structure 80, which in the illustrated embodiment is a man-portable launch platform. The launch platform 80 includes a launch tube 82, a shoulder rest 84, an aft hand grip 86 with a trigger mechanism, and a forward hand grip 88. A quick-release retaining cap 85 on the forward end of the launch tube 82 retains a missile 90 inside the launch tube 82. The missile 90 has an eject motor 10 attached at the rocket motor nozzle exit cone 92. Upon activation of the trigger mechanism, current is passed through the lead wires 72 to the igniter 70 to initiate combustion of the gas generant 24, thereby creating a thrust exhaust plume 96 that propels the missile 90 and eject motor 10 from the launch tube 82, as shown in FIG. 4B. The amount of gas generant 24 contained within the screen pack 26 is preferably chosen so that the gas generant completes combustion before the eject motor leaves the launch tube 82, so that the operator will not be subjected to any exhaust plume of the eject motor. Accordingly, a gas generant having a high surface area grain geometry which provides short action time (approximately 60 msec) is preferred. The amount, composition, and grain geometry of the gas generant should be chosen so as to provide sufficient thrust to propel the missile 90 a safe distance from the launch platform 80 before primary rocket motor ignition, yet allow the gas generant material to burn completely before the eject motor leaves the launch tube 82. Naturally, these parameters will depend on the size and weight of the missile as well as the length of the launch tube.

Figure 4C:
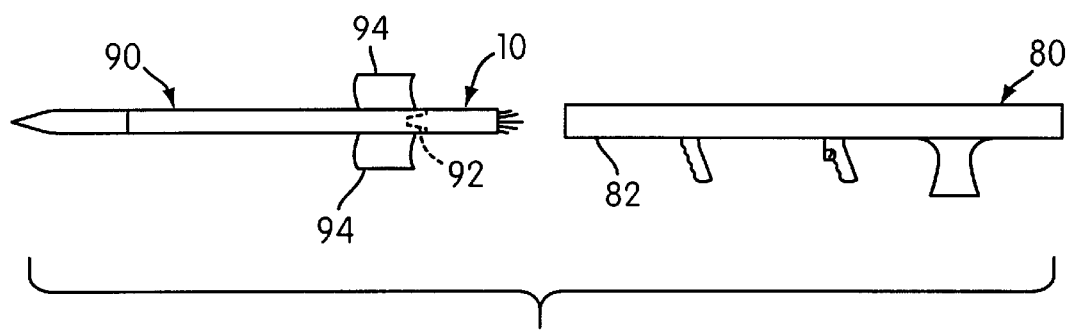

As shown in FIG. 4C, with the missile 90 and eject motor 10 attached thereto propelled from the launch tube 82, the gas generant has preferably completely burned out so that no exhaust plume is present. The missile 90 may include deployable stabilizing fins 94.

Figure 4D:
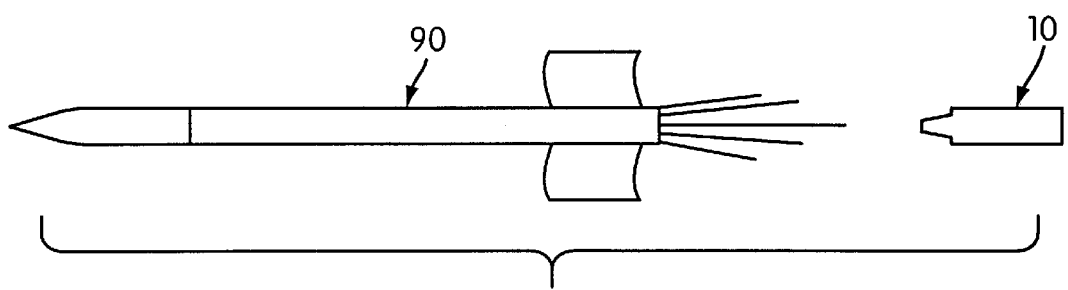

As shown in FIG. 4D, after the missile 90 has been propelled a safe distance (for example, 75 to 100 feet) from the launch platform structure 80, the combustible rocket motor propellant of the primary rocket motor is ignited and the eject motor 10 is separated from the missile 90, either by the thrust generated by the primary rocket motor or by an aero-braking device, as described above.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. An eject motor to be coupled to a missile that is launched from a launch platform structure and is propelled by ignited combustible rocket motor propellant for initiating a launch sequence of the missile by propelling the missile from the launch platform structure prior to ignition of the combustible rocket motor propellant, said eject motor comprising:

a case including structure for coupling said case to the missile;

an ignitable gas generant material stored in said case;

a screen enclosure disposed within said case for retaining said ignitable gas generant material within said case;

an igniter mechanism constructed and arranged to ignite said ignitable gas generant material, said ignitable gas generant material generating combustion gases when ignited; and a nozzle secured to said case and constructed and arranged to focus and direct combustion gases generated by said ignitable gas generant to create a thrust acting on the missile to which said eject motor is coupled to propel the missile from the launch platform structure.

2. The eject motor of claim 1, wherein said case is constructed and arranged to separate from the missile after the missile is propelled from the launch platform structure personnel.

3. The eject motor of claim 1, wherein said ignitable gas generant comprises a composition of polyacrylamide, basic copper nitrate, and hexammine cobalt (III) nitrate.

4. The eject motor of claim 3, wherein said ignitable gas generant comprises a composition of 4 wt % 2 polyacrylamide, 23 wt % basic copper nitrate, and 73 wt % hexammine cobalt (III) nitrate.

5. The eject motor of claim 1, wherein said ignitable gas generant is granular with a grain geometry of a right circular cylinder.

6. The eject motor of claim 1, wherein said screen enclosure comprises a metal mesh formed so as to generally conform to an interior surface of said case.

7. The eject motor of claim 6, wherein said metal mesh is arranged within said case so as to create a space between said metal mesh and the interior of said case.

8. The eject motor of claim 6, wherein said screen enclosure further comprises an aft screen assembly including a screen mesh and a retainer member supporting said screen mesh and extending substantially across the width of the interior of said case, said aft screen assembly being disposed at an aft open end of said metal mesh.

9. The eject motor of claim 1, wherein said nozzle is formed of graphite.

10. The eject motor of claim 1, wherein said nozzle is disposed within said case near an open aft end thereof and comprises a central opening formed therein and generally defining an inwardly tapered contraction portion, a throat extending from an end of said contraction portion having a minimum transverse dimension, and an outwardly tapered expansion portion extending from an end of said throat opposite said contraction portion.

11. The eject motor of claim 1, wherein said igniter mechanism comprises a pyrotechnic squib embedded in a pack of igniter material.

12. The eject motor of claim 11, wherein said igniter material comprises granules or pellets of B/KNO$_3$.

13. The eject motor of claim 2, wherein at least a portion of said structure for coupling said case to a missile is secured to a portion of the missile with an adhesive to create an adhesive bond that will fail when subjected to heat and pressure generated by combustion of the rocket motor propellant, thereby permitting said case to separate from the missile.

14. The eject motor of claim 1, wherein said ignitable gas generant material comprises pellets.

* * * * *